Oct. 23, 1962          H. BEYER          3,060,356

TUBULAR CAPACITOR AND METHOD OF MAKING SAME

Filed May 14, 1956

INVENTOR.
Haim Beyer
BY *W. D. Keith*
Attorney

United States Patent Office 3,060,356
Patented Oct. 23, 1962

3,060,356
TUBULAR CAPACITOR AND METHOD OF MAKING SAME
Haim Beyer, New Bedford, Mass., assignor to Cornell-Dubilier Electric Corporation, South Plainfield, N.J., a corporation of Delaware
Filed May 14, 1956, Ser. No. 584,497
10 Claims. (Cl. 317—242)

This invention is concerned with a capacitor. More specifically, the invention concerns an improvement in connection with the attachment of lead wires to a tubular type capacitor.

Heretofore, difficulty has been experienced in the coating of a capacitor section which is to be protected by a tubular casing; the assembled product is most commonly known as a "tubular condenser." There has been no convenient arrangement for holding the capacitor section inside its outer tube, while the wax or other sealing and insulating material is poured into the tube. In addition, the construction used heretofore involved soldering the lead wires to the foil edges at either end of the capacitor section (a cylindrical roll of foils interleaved with insulating sheets), and the resulting structure was not strong for withstanding tensile forces applied to the lead wires.

The above difficulties have been overcome by this invention wherein the lead wires when attached to the capacitor section are given a configuration such that a bend or loop is provided in the lead wire. This bend extends far enough beyond the outer surface of the capacitor section, to make contact with the inside of the tube that the capacitor section is to be enclosed within. In this manner, a capacitor section may be merely placed manually within its enclosing tube, where it will remain by the frictional engagement of the lead wire loops. Then the wax or other material may readily be poured into the tube around the capacitor section to complete the capacitor, except for crimping of the edges of the tube or otherwise finishing the ends if so desired.

Another advantage that flows from the use of construction according to this invention, is that a finished capacitor has in its lead wires a strain take-up construction. This construction is such that excessive tension applied to the lead wires which would formerly dislodge the soldered connection of such wires from the edge of the capacitor section or seriously weaken the same, will instead be taken up in straightening out the bend or loop in the lead wire, prior to the dislodging or weakening of the soldered connection.

Briefly, this invention in concerned with an improved construction for a tubular capacitor which has a wound cylindrical capacitor section with terminals extending at each end thereof. Such a capacitor section is inserted in a hollow tube of insulating material, and is coated with wax or other sealing and insulating material inside the tube. The improvement comprises terminal lead wires having means for facilitating a good electrical strong mechanical bond with the terminals, and means for resiliently contacting the inside surface of the hollow tube to hold the capacitor section in place while said wax is poured around the section and the terminal lead wires adjacent thereto.

The invention also includes a method of constructing tubular capacitors that includes the steps of shaping the lead wires of such capacitors to include lateral extensions beyond the outside of the capacitor section as measured from the longitudinal axis thereof. Also, the step of attaching said lead wires to the terminals of the capacitor section, and placing the capacitor section with lead wires attached into the outer tube therefor.

And finally including a step of filling said tube with a sealing material while the capacitor section is held therein by the lateral extensions contacting the inside surface of the tube.

Some preferred embodiments of the invention are described in greater detail below and illustrated in the drawings in which.

Like reference numbers refer to like parts throughout.

Figure 1:
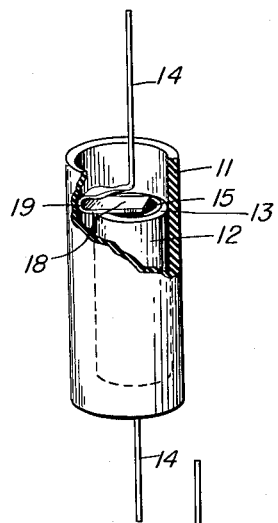
FIGURE 1 is a perspective view partly broken away showing a capacitor with its capacitor section within the outer tube, ready for pouring of insulating and sealing material.

Referring to FIGURE 1, it will be observed that a tubular capacitor of the type here illustrated includes an outer hollow cylinder 11, which is ordinarily constructed of heavy cardboard or similar insulating material. Longitudinally centered within the hollow interior of the tube or cylinder 11 there is a capacitor section 12. Such a capacitor section is ordinarily constructed by rolling layers of foil, such as aluminum or the like, interleaved with various types of insulating material, such as high grade papers, to form a cylindrical roll that is completed when the outer layer of the paper is pasted down, as by means of a strip covered with glue (not shown). Capacitor section 12 has edges 13 of the foils which go to make up it electrodes, extending from either end of the section. Lead wires 14 of the completed capacitor are then electrically connected to the electrodes 13 by soldering 15 or the like. It will be observed that a terminal formed by foil edges 13 has a lead wire 14 attached thereto, by means of solder 15 illustrated.

It is to be noted that the end of the lead wire 14 has been flattened to form a relatively wide area 18, which provides a good surface for completing the soldering attachment of the lead wire 14 to the foil edges 13 of the capacitor section 12. In addition, and of great importance in connection with this invention, it is to be noted that lead wire 14 has been bent in a return bend loop 19 adjacent to the wide end portion 18 of the lead wire. Thus, by soldering the lead wire 14 to the foil edge 13 of the capacitor section 12 with the outer extension of the loop 19 extending beyond the surface of the cylindrical capacitor section 12 a sufficient extent, this loop 19 will make a springy frictional contact with the inner surface of the tube 11. In this manner as the finished capacitor is assembled, the capacitor section 12 need merely be pressed into the inside of outer tube 11 to the proper location therein, and then the wax or other sealing and insulating material may be poured directly into the tube 11, so as to coat the capacitor section 12 and fill the inside open space of the tube 11.

It is to be noted that among the advantages gained by constructing a tubular capacitor in this manner are the above described features as to the manner in which return bends 19 make contact with the inside surface of the tube 11 to hold the capacitor section 12 in place. Furthermore, when the capacitor is in use after its completion, the construction employed is one which provides for a take-up action which will relieve excessive tension applied to the lead wires 14 prior to the tearing loose or loosening of the soldered connection 15. This is important since this soldered joint electrically completes a circuit between the lead wire 14 and the electrode of the capacitor section 12 that is formed by the foil edges 13.

Figure 2:
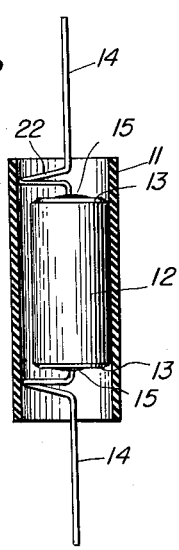
FIGURE 2 is a side elevation partly in cross section showing the capacitor section in place within its tube and illustrating another embodiment of the lead configuration.

In FIGURE 2 there is illustrated another manner of constructing the return bend structure for the lead wires. It is pointed out that the elements of the capacitor are the same as those illustrated in FIGURE 1 with the exception of the end portion of the lead wires adjacent to the capacitor section 12. Consequently, the same reference numbers are employed for the corresponding elements. Thus the outer tube 11 has the capacitor section 12 placed therein with soldered connections 15 making electrical and mechanical connection between the ends of the lead wires 14 and the foil edges 13. In this modification, however, the lead wires 14 are shown soldered to the foil edges 13 in any convenient manner so that the lead wire extending from the soldered joint 15 is centrally located near the axis of the capacitor. Then as the lead wire extends axially outward there is a return bend portion 22 that extends laterally from the axis of the section 12, sufficiently to make contact with the inside surface of the tube 11, and return to a central or axial location from which the lead wire 14 extends at the end of the finished capacitor.

Figure 3:
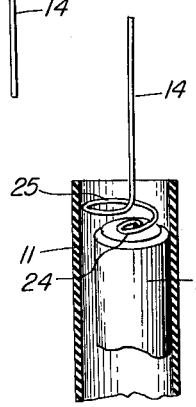
FIGURES 3, 4 and 5 are partial cross-sectional views illustrating additional embodiments of the lead wire configuration.

FIGURE 3 illustrates another modification wherein the end of the lead wire 14 that is connected to the capacitor section 12, takes a looped or spiraled configuration 24 for providing a good large area surface to facilitate the soldered connection. From loop 24 the wire is bent generally in a spiraled manner with an increasing sweep so as to create a return bend portion 25 that extends laterally beyond, or overlaps, the outside surface of the capacitor section 12 sufficiently to make contact with the inside surface of the tube 11 in the same manner as with each of the other two modifications, illustrated in FIGURES 1 and 2.

Figure 4:
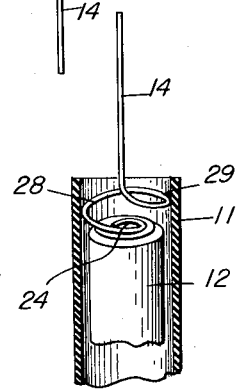
Figure 5:
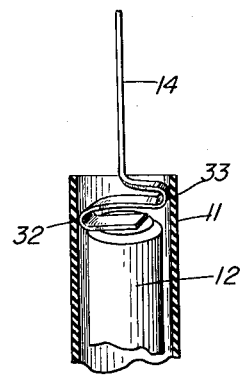

In FIGURES 4 and 5 there are shown two different modifications of an arrangement whereby the capacitor section 12 is not only frictionally held in place inside of its outer tube 11, but is held centered therein without making contact with the inside surface of the tube 11. This is accomplished by providing a spreading spiral return bend arrangement such as that shown in FIGURE 4. The end that is soldered to the capacitor section 12 is in a loop 24 like that of the FIGURE 3 arrangement, and then the lead wire is bent to form a return bend extension 28 that is then carried across to a similar return bend extension 29 for the opposite side of the capacitor section 12. In this way the capacitor section 12 is held centered between the edges of tube 11 by reason of the contacting of the return bends 28 and 29 with the inside surface of the tube 11. In FIGURE 5 a similar arrangement is had with the use of a flattened end. In this embodiment there is a return bend 32 that extends out to make contact with one side of the inner surface of tube 11, while the lead 14 is then carried across to a similar return bend 33 that extends also beyond the outer surface of capacitor section 12 so as to make contact with the inside surface of tube 11.

It is to be noted that the structure and method used in constructing a tubular capacitor, which this invention teaches, includes means for greatly facilitating the wax coating of the capacitor section within its protective outer tube. In addition, the loops or bends in the lead wires, provide a tension relieving structure such that excessive pull on the lead wires will first straighten the lead wires before putting undue stress on the soldered connection.

While certain embodiments of the invention have been described in some detail in accordance with the applicable statutes, this is not to be taken as in any way limiting the invention but merely as being descriptive thereof.

What is claimed is:
1. A capacitor construction comprising an open ended tubular electrically insulating casing member having a predetermined internal diameter, a convolutely wound multielectrode capacitor section including insulating strips interleaved with metallic electrodes, said section having a maximum transverse dimension appreciably less than the internal diameter of said casing member and said section being disposed within said casing member, a pair of elongate resilient terminal leads extending in opposite directions from the ends of said capacitor section and each lead having one end portion metallically joined to a respective one of said electrodes at the respective ends of said capacitor section, each lead extending beyond a respective end of said casing member and the portion of each lead that emerges from the corresponding end of the casing member being substantially centered, and each said lead having an integral deformed portion between said one end portion and said centered portion thereof, said deformed portion being disposed substantially transverse to the longitudinal axis of said casing member and in resilient contact with the inner wall of said casing member at at least two discrete locations at substantially opposite sides of the capacitor section, and a filler material filling the spaces about said deformed portions of said terminal leads and filling the space within said casing unoccupied by said capacitor section.

2. The capacitor construction as set forth in claim 1 wherein said capacitor section is axially disposed within said casing with its periphery disposed in substantially uniform spaced relation with the adjacent inner surface of said casing.

3. The capacitor construction as set forth in claim 1 wherein said deformed intermediate portion of said terminal lead means is shaped to provide a return bend configuration having its end portions positioned in diametrically disposed engagement with said casing.

4. The capacitor construction as set forth in claim 1 wherein said deformed intermediate portion of said terminal lead means is shaped to form a helix of a diameter sufficient to contact the inner wall of said casing.

5. A capacitor construction comprising an open ended tubular electrically insulating casing member having a predetermined internal diameter, a convolutely wound multi-electrode capacitor section including insulating strips interleaved with metallic electrodes, said section having a maximum transverse dimension appreciably less than the internal diameter of said casing member and said section being disposed within said casing member, a pair of elongate resilient terminal leads extending in opposite directions from the ends of said capacitor section and each lead having one end portion metallically joined to a respective one of said electrodes at the respective ends of said capacitor section, each lead extending beyond a respective end of said casing member, and the portion of each lead that emerges from the corresponding end of the casing member being substantially centered, and each said lead having an integral deformed portion between said one end portion and said centered portion thereof, each said deformed portion being disposed substantially transverse to the longitudinal axis of the casing member and in resilient contact with the inner wall of said casing member at a location intermediate the end of said capacitor section and the end of said casing member, said deformed portions biasing said capacitor section against the inner wall of said casing member, and a filler material filling the spaces about said deformed portions of said terminal leads and filling the space within said casing unoccupied by said capacitor section.

6. A capacitor sub-assembly construction comprising an open ended tubular electrically insulating casing member having a predetermined internal diameter, a convolutely wound multi-electrode capacitor section including insulating strips interleaved with metallic electrodes, said section having a maximum transverse dimension appreciably less than the internal diameter of said casing member and said section being disposed within said casing member, and a pair of elongate resilient terminal leads extending in opposite directions from the ends of said capacitor section and each lead having one end portion metallically joined to a respective one of said electrodes at the respective ends of said capacitor section, each lead extending beyond a respective end of the casing member, and the portion of each lead that emerges from the corresponding end of the casing member being substantially centered, and each said lead having an integral deformed portion between said one end portion and said centered portion thereof, each said deformed portion being disposed substantially transverse to the longitudinal axis of said casing and in resilient contact with the inner surface of said casing member at at least two discrete locations at substantially opposite sides of the capacitor section for positioning said capacitor section in predetermined spatial relationship within said casing member and providing protection for said joined ends of said leads from mechanical stresses applied to the opposite ends of said leads.

7. The construction as set forth in claim 6 wherein said capacitor section is axially disposed within said casing with its periphery disposed in substantially uniform spaced relation with the adjacent surface of said casing.

8. The construction as set forth in claim 6 wherein said deformed intermediate portion of said terminal lead means is shaped to provide a return bend configuration having its end portions positioned in diametrically disposed engagement with said casing.

9. The construction as set forth in claim 6 wherein said deformed intermediate portion of said terminal lead means is shaped to form a helix of a diameter sufficient to resiliently contact the inner wall of said casing.

10. A capacitor sub-assembly construction comprising an open ended tubular electrically insulating casing member having a predetermined internal diameter, a convolutely wound multi-electrode capacitor section including insulating strips interleaved with metallic electrodes, said section having a maximum transverse dimension appreciably less than the internal diameter of said casing member and said section being disposed within said casing member, and a pair of elongate resilient terminal leads extending in opposite directions from the ends of said capacitor section and each lead having one end portion metallically joined to a respective one of said electrodes at the respective ends of said capacitor section, each lead extending beyond a respective end of the casing member and the portion of each lead that emerges from the corresponding end of the casing being substantially centered, and each said lead having an integral formed portion between said one end portion and said centered portion thereof, said deformed portions of said leads being disposed substantially transverse to the longitudinal axis of said casing and in resilient contact with the inner wall of said casing member and biasing said capacitor section against the inner surface of said casing member, for retaining the capacitor section within said casing member and for providing protection for said joined ends of said terminal leads from mechanical stresses imposed on the opposite ends of said leads.

References Cited in the file of this patent

UNITED STATES PATENTS

| 1,890,312 | Caine | Dec. 6, 1932 |
|---|---|---|
| 1,890,313 | Caine | Dec. 6, 1932 |
| 2,452,540 | Barnard | Nov. 2, 1948 |
| 2,485,913 | Osterman | Oct. 25, 1949 |
| 2,651,100 | Grouse | Sept. 8, 1953 |
| 2,673,972 | Minnium | Mar. 30, 1954 |
| 2,698,372 | Patla | Dec. 28, 1954 |
| 2,753,616 | Tognola | July 10, 1956 |
| 2,894,316 | Genovese | July 14, 1959 |

FOREIGN PATENTS

| 329,215 | Great Britain | May 15, 1930 |